(12) United States Patent
Sato et al.

(10) Patent No.: US 11,975,782 B2
(45) Date of Patent: May 7, 2024

(54) DECORATIVE MOLDED COMPONENT

(71) Applicant: Honda Motor Co., Ltd., Tokyo (JP)

(72) Inventors: Ikue Sato, Wako (JP); Hiroki Sakata, Wako (JP); Kosaku Mizutani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 442 days.

(21) Appl. No.: 17/415,548

(22) PCT Filed: Dec. 17, 2019

(86) PCT No.: PCT/JP2019/049419
§ 371 (c)(1),
(2) Date: Jun. 17, 2021

(87) PCT Pub. No.: WO2020/129978
PCT Pub. Date: Jun. 25, 2020

(65) Prior Publication Data
US 2022/0055708 A1 Feb. 24, 2022

(30) Foreign Application Priority Data
Dec. 18, 2018 (JP) .................. 2018-236699

(51) Int. Cl.
*B62J 17/02* (2006.01)
*B29C 51/14* (2006.01)
*B29L 31/30* (2006.01)

(52) U.S. Cl.
CPC ............... *B62J 17/02* (2013.01); *B29C 51/14* (2013.01); *B29L 2031/3041* (2013.01)

(58) Field of Classification Search
CPC ... B62J 17/00; B62J 17/02; B62J 17/04; B62J 17/06; B62J 17/086; B29C 51/14;
(Continued)

(56) References Cited

U.S. PATENT DOCUMENTS 4,087,110 A * 5/1978 Vetter ...................... B62J 17/04
296/78.1
4,529,242 A * 7/1985 Watanabe ............. B60S 1/0438
296/70

(Continued)

FOREIGN PATENT DOCUMENTS

| CN | 1903552 A | 1/2007 |
| JP | 62-144787 U | 9/1987 |

(Continued)

OTHER PUBLICATIONS

International Search Report (PCT/ISA/210) issued in PCT/JP2019/049419, dated Mar. 10, 2020.

*Primary Examiner* — Gregory A Blankenship
(74) *Attorney, Agent, or Firm* — Birch, Stewart, Kolasch & Birch, LLP

(57) ABSTRACT

A decorative molded component includes: a substrate having a shell extending along a mating surface and a through hole adjacent to the shell and defined along the mating surface; and a molded body coated to the mating surface, the molded body covering the through hole to be continuous from a skin bonded to the shell. The decorative molded component improves appearance while keeping the functions of the two members.

7 Claims, 22 Drawing Sheets

(58) Field of Classification Search
CPC ............. B29L 2031/3041; B60R 13/02; B60R 13/0237; B60R 13/0243; B60R 13/025; B60R 13/0256; B60R 13/04; B60R 19/44; B60R 19/52; B60R 2019/1886
USPC ...................................... 296/77.1, 78.1, 84.1
See application file for complete search history.

(56) References Cited

U.S. PATENT DOCUMENTS

| | | | |
|---|---|---|---|
| 6,293,606 B1* | 9/2001 | Jarosz | B62J 17/04 296/78.1 |
| 6,511,109 B1* | 1/2003 | Schultz | B60R 19/18 293/142 |
| 6,598,927 B2* | 7/2003 | Kurohori | B62J 17/08 296/79 |
| 6,637,786 B2* | 10/2003 | Yamagiwa | F16F 7/121 293/105 |
| 7,438,350 B1* | 10/2008 | Peterson | B62D 25/166 296/29 |
| 11,052,835 B2* | 7/2021 | Lehman | B29C 44/06 |
| 2004/0043187 A1* | 3/2004 | Ota | B32B 5/18 428/192 |
| 2005/0186388 A1* | 8/2005 | Mekas | B60R 13/0243 428/116 |
| 2005/0194806 A1* | 9/2005 | Cowelchuk | B60N 2/78 296/153 |
| 2005/0260385 A1* | 11/2005 | Cowelchuk | B32B 27/32 428/138 |
| 2006/0222841 A1* | 10/2006 | Masumizu | B32B 27/065 428/319.3 |
| 2007/0075464 A1 | 4/2007 | Furuta et al. | |
| 2007/0149105 A1* | 6/2007 | Nakagome | F02M 35/162 454/136 |
| 2013/0015008 A1* | 1/2013 | Yama | B62J 17/00 180/68.6 |
| 2013/0306391 A1* | 11/2013 | Kontani | B62K 11/00 180/219 |
| 2017/0182729 A1* | 6/2017 | Fox | B29C 45/0005 |
| 2017/0274953 A1* | 9/2017 | Niijima | B62J 17/04 |
| 2018/0257594 A1* | 9/2018 | Du | B60R 13/04 |
| 2020/0346591 A1* | 11/2020 | Butsch | B32B 27/365 |
| 2021/0370556 A1* | 12/2021 | Klusmeier | B29C 43/18 |
| 2022/0017173 A1* | 1/2022 | Sato | B32B 27/00 |
| 2022/0055708 A1* | 2/2022 | Sato | B29C 51/14 |
| 2022/0135163 A1* | 5/2022 | Iacenda | B62J 17/04 296/89 |

FOREIGN PATENT DOCUMENTS

| | | |
|---|---|---|
| JP | 6-16550 U | 3/1994 |
| JP | 8-238639 A | 9/1996 |
| JP | 11-254470 A | 9/1999 |
| JP | 2002-70432 A | 3/2002 |
| JP | 2002-187457 A | 7/2002 |
| JP | 2002-219765 A | 8/2002 |
| JP | 2007-30380 A | 2/2007 |
| JP | 2009-154428 A | 7/2009 |
| JP | 2010-234690 A | 10/2010 |
| JP | 2011-207118 A | 10/2011 |
| JP | 2013-104267 A | 5/2013 |
| WO | WO 2007/013292 A1 | 2/2007 |

* cited by examiner

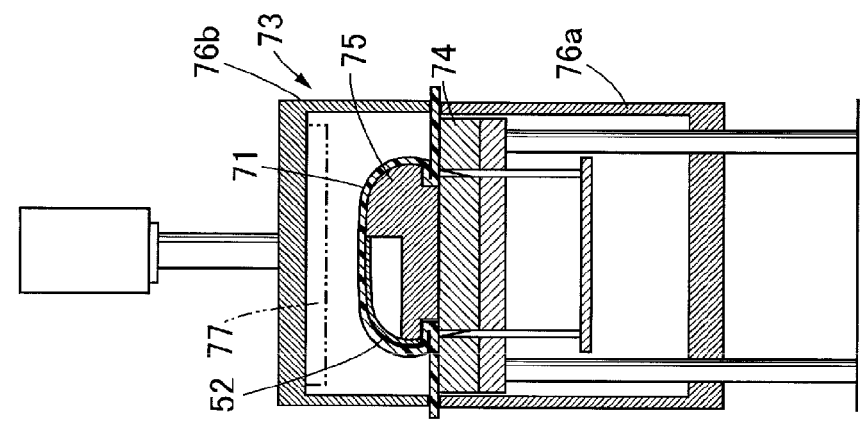
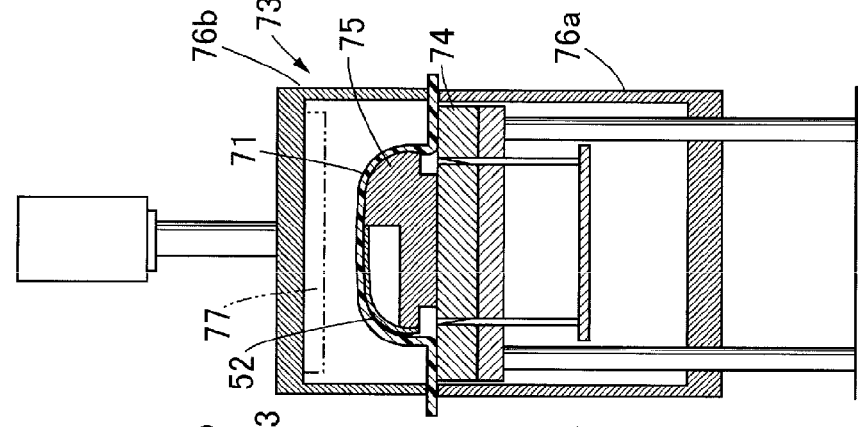
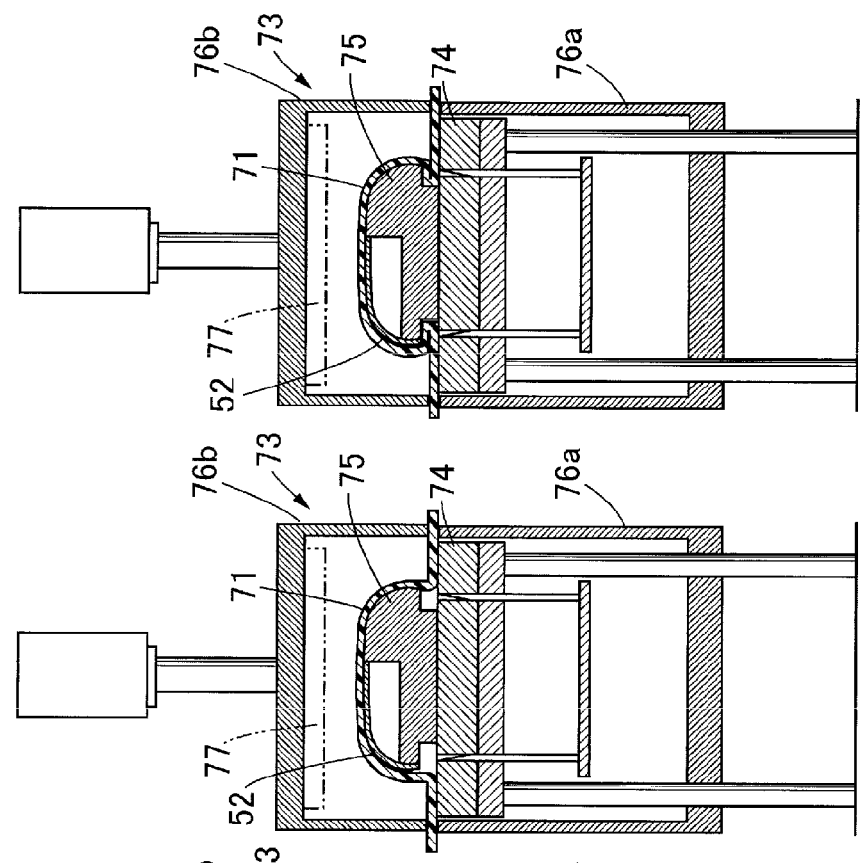
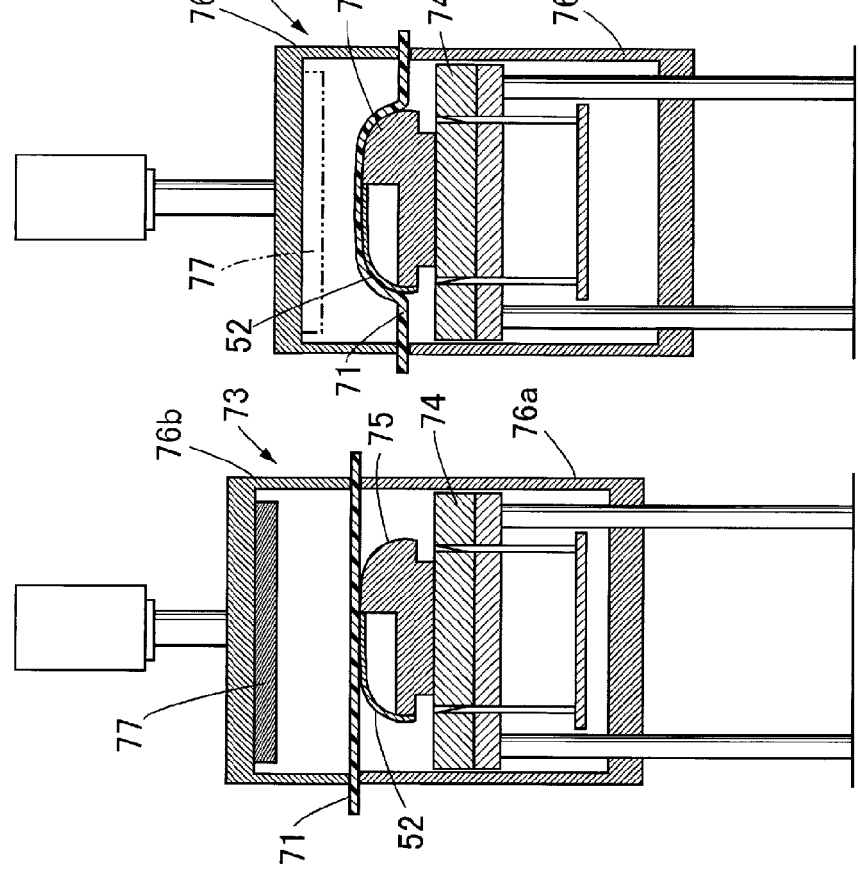

DECORATIVE MOLDED COMPONENT

FIELD

The present invention relates to a decorative molded component including a substrate, and a skin having a decoratively colored surface and coated and fixed to the outer surface of the substrate.

BACKGROUND

Patent Literature 1 discloses a method for manufacturing a decorative molded component by coating the main body of a molded component with a decorative sheet (sheet for decoration). The main body of the molded component has a rigidity required for the product by itself. For decoration, an adhesive sheet is overlaid on the outer surface of the main body of the molded component for fixation. The adhesive sheet forms an adhesive layer on the outer surface of the main body of the molded component. A decorative sheet is then overlaid on the adhesive layer. The adhesive sheet attaches the decorative sheet to the outer surface of the main body of the molded component. The decorative sheet has the functions as decoration and a protective film. The decorative sheet does not contribute to the rigidity.

CITATION LIST

Patent Literature

Patent Literature 1 WO 2007/013292A
Patent Literature 2: JP 2002-187457 A

BRIEF SUMMARY

Technical Problem

Typically, a windshield visor is attached to the front cowl of a motorcycle. The visor is attached to the front cowl with screws or rivets, for example. The seam between the front cowl and the visor appears on the exterior. Seamless connection of the front cowl and the visor will enhance the appearance.

In view of the above-stated situation, the present invention provides a decorative molded component with improved appearance while keeping the functions of two members.

Solution to Problem

A first aspect of the present invention provides a decorative molded component including: a substrate having a shell extending along a mating surface and a through hole adjacent to the shell and defined along the mating surface; and a molded body coated to the mating surface, the molded body covering the through hole to be continuous from a skin bonded to the shell.

According to a second aspect, in addition to the structure of the first aspect, the molded body at the through hole has transparency.

According to a third aspect, in addition to the structure of the first or the second aspect, the skin is a laminate bonded to the shell at the mating surface with adhesive.

According to a fourth aspect, in addition to the structure of the third aspect, the laminate is a mold of a resin sheet that is coated to the mating surface by thermoforming.

According to a fifth aspect, in addition to the structure of the first or the second aspect, the skin and the molded body are a mold of a resin sheet that is coated to the shell and the through hole at the mating surface by thermoforming.

Advantageous Effects

According to the first aspect, the skin covering the outer surface of the substrate and the molded body covering the through hole of the substrate are seamlessly continuous. This improves the appearance while keeping the functions of the two members.

According to the second aspect, the molded body has the transparency required for the molded body itself.

According to the third aspect, the skin is a laminate bonded to the mating surface. The skin is easily molded to follow the mating surface.

According to the fourth aspect, thermoforming is used to mold the decorative molded component. The skin is easily molded from a resin sheet.

According to the fifth aspect, the skin is a laminate coated to the mating surface. The molded body covers the through hole continuously from the laminate. The skin and the molded body are easily molded from a single resin sheet to follow the mating surface.

BRIEF DESCRIPTION OF DRAWINGS

FIG. 16 is a schematic view of a method of manufacturing a front center cowl using a thermoforming apparatus.

REFERENCE SIGNS LIST

23a . . . Decorative molded component (front center cowl)
35 . . . Molded body (visor)
52 . . . Substrate
53 . . . Skin
54 . . . Shell
58 . . . Through hole
71 . . . Resin sheet (decorative sheet)

DETAILED DESCRIPTION

Some embodiments of the present invention will be described with reference to the drawings. The following descriptions refer to terms, such as up and down, front and rear, and left and right, of the vehicle body relative to the viewing direction of a passenger riding on the motorcycle.

Figure 1:
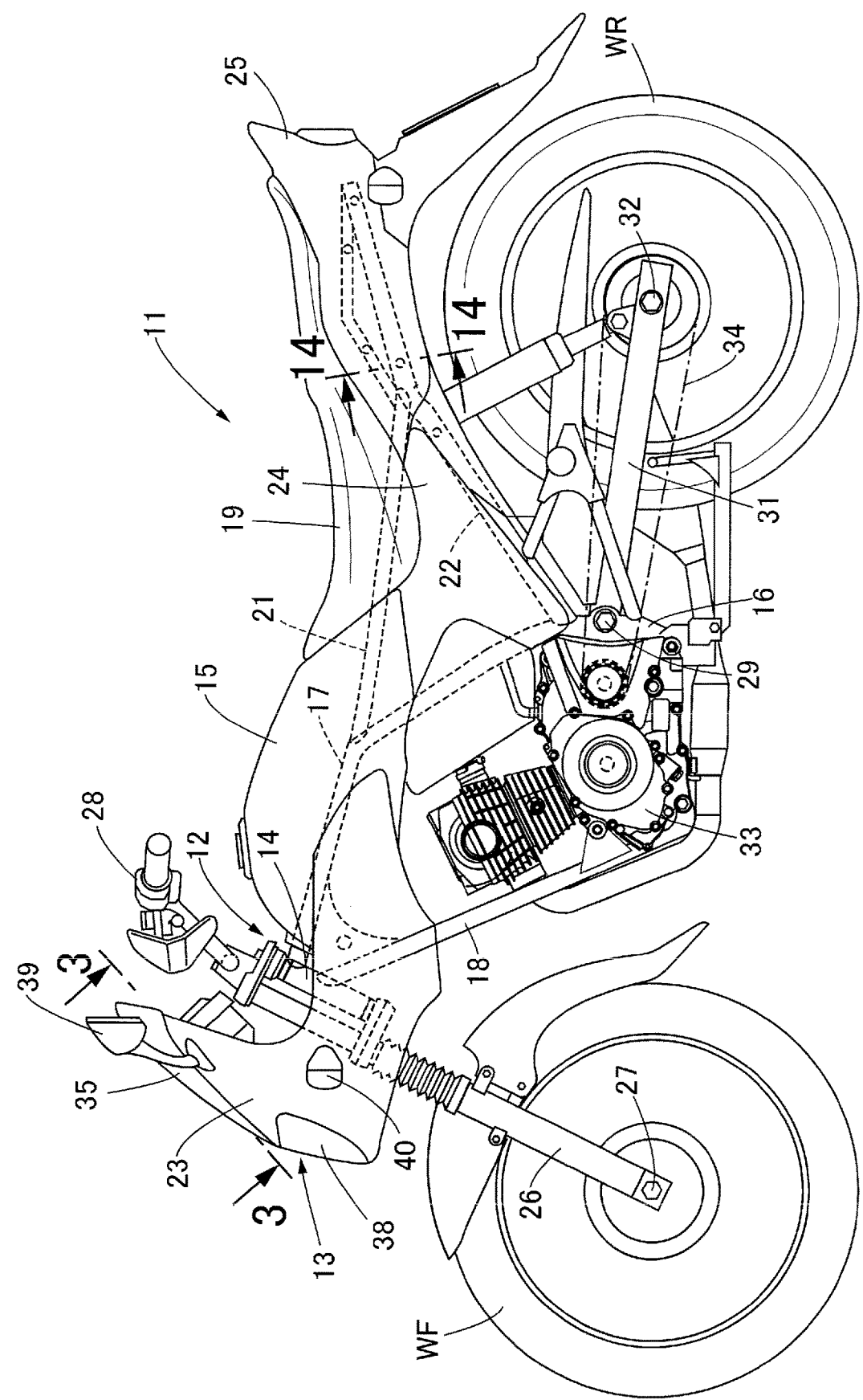
FIG. 1 is a side view schematically showing the overall image of a motorcycle (saddled vehicle) according to one embodiment of the present invention.

FIG. 1 schematically shows the overall image of a motorcycle that is a saddled vehicle according to one embodiment of the present invention. The motorcycle 11 includes a vehicle body frame 12, and a cowl 13 attached to the vehicle body frame 12. The vehicle body frame 12 includes: a head pipe 14; a main frame 17 extending rearward downward from the head pipe 14 and supporting a fuel tank 15, the main frame 17 having a pivot frame 16 at the lower rear end; a down frame 18 located below the main frame 17 and extending downward from the head pipe 14; and a rear frame 22 joining to the rear end of the main frame 17 and extending rearward upward to join to a seat rail 21 supporting a passenger seat 19. The rear frame 22 supports the seat rail 21 from the below.

The cowl 13 includes: a front cowl 23 covering the front of the head pipe 14; a side cowl 24 continuous to the lower ends of the fuel tank 15 and the passenger seat 19, and laterally covering the seat rail 21; and a rear cowl 25 behind the side cowl 24 to be continuous to the lower end of the passenger seat 19 and cover the rear of the seat rail 21. The outer surfaces of the front cowl 23, side cowl 24 and rear cowl 25 are colored.

The head pipe 14 supports a front fork 26 steerably. The front fork 26 supports a front wheel WF rotatably around a front axle 27. A steering handle 28 is connected to the upper end of the front fork 26.

A swing arm 31, located at a rear part of the vehicle, connects to the vehicle body frame 12 to be vertically swingable around a pivot 29. The swing arm 31 supports a rear wheel WR at the rear end so that the rear wheel WR is rotatable around a rear axle 32. A power unit 33 is mounted on the vehicle body frame 12 between the front wheel WF and the rear wheel WR. The power unit 33 generates a driving force to be transmitted to the rear wheel WR. The driving force from the power unit 33 is transmitted to the rear wheel WR via a power transmission device 34.

Figure 2:
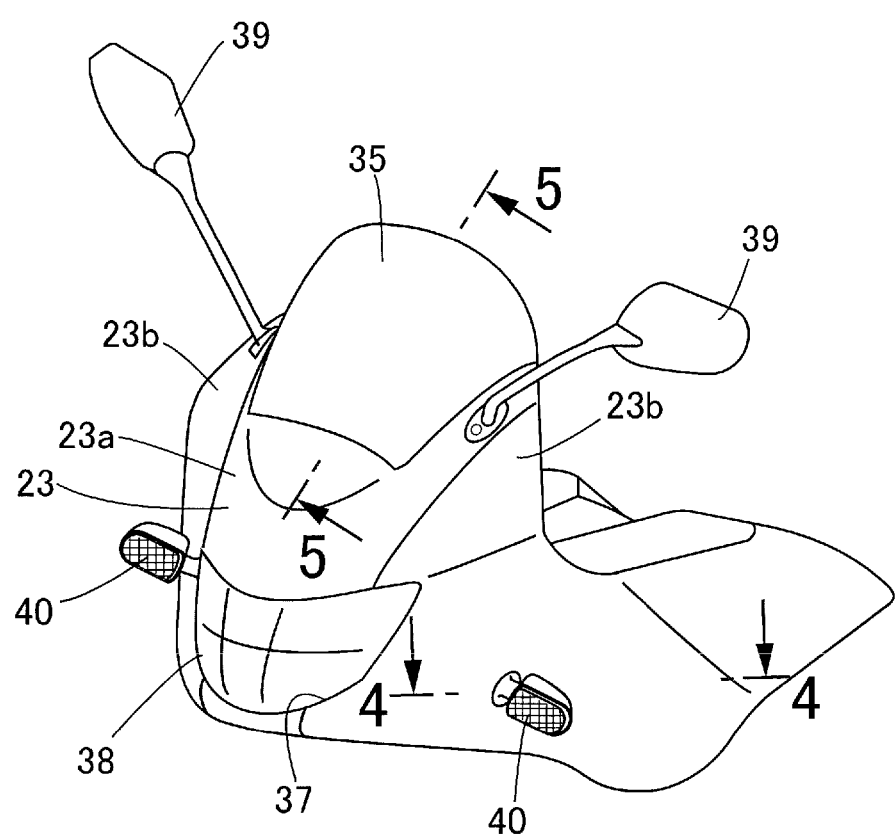
FIG. 2 is an enlarged perspective view schematically showing the configuration around a front cowl.
Figure 5:
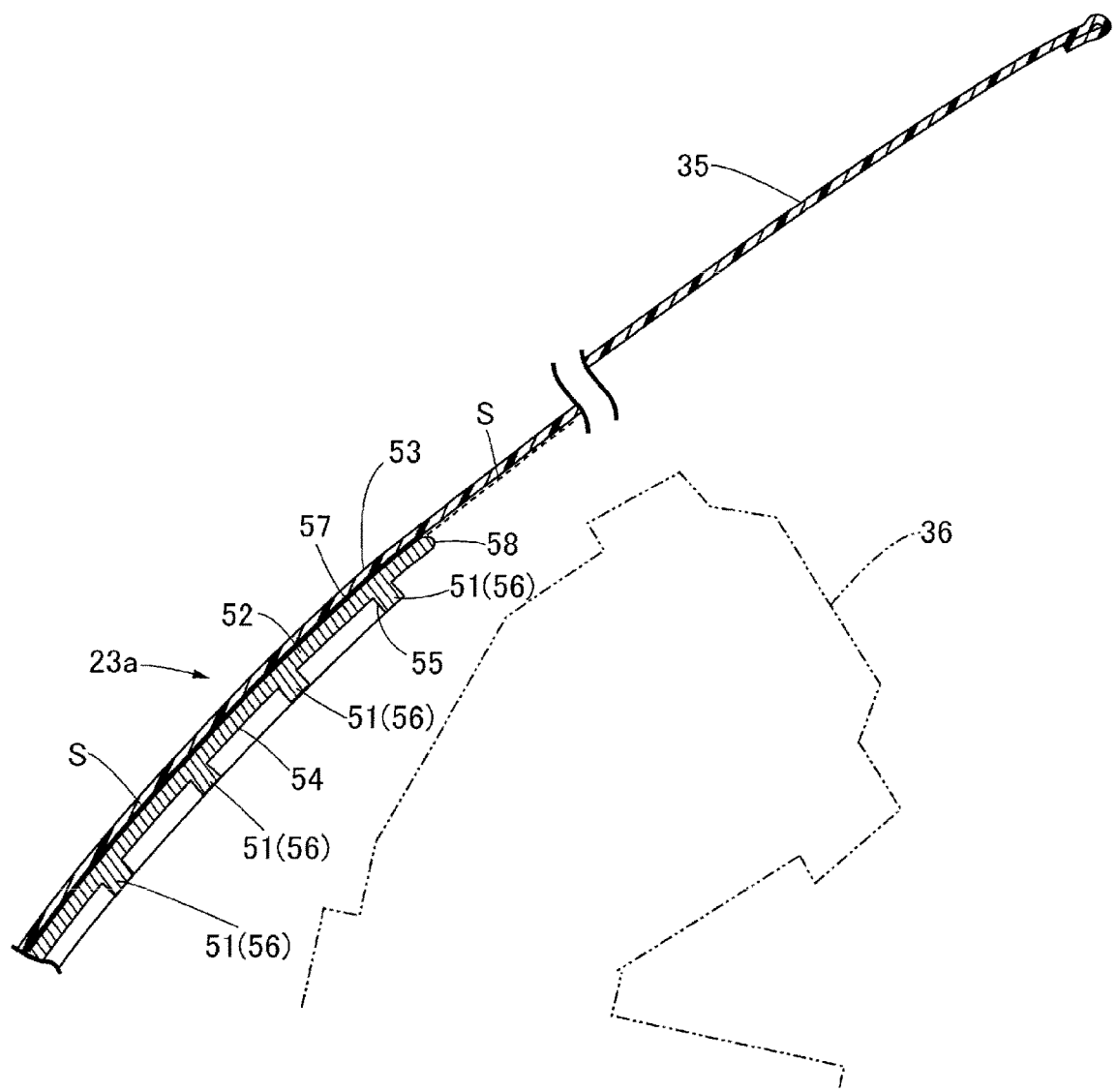
FIG. 5 is a cross-sectional view taken along the line 5-5 of FIG. 2, showing the structure of the front center cowl and a visor.

As shown in FIG. 2, a visor (windscreen) 36 is incorporated to the front cowl 23. The visor 35 extends from the upper edge of the front cowl 23 and covers the space above the head pipe 14 from the front. As shown in FIG. 5, the visor 35 covers instruments 36 located in front of the head pipe 14 and behind the visor 35 and secured to the front cowl 23.

The front cowl 23 has an opening 37 located in the center below the visor 35 and opening toward the front of the vehicle body, and a headlight 38 is mounted in this opening 37. The headlight 38 illuminates the front of the vehicle in response to the supply of electric power. Rear view mirrors 39 extending upward from the left and right of the visor 35 are fixed to the front cowl 23. The rear view mirrors 39 allow the driver to check the rear view. Blinkers 40 are fixed to the front cowl 23 at positions slightly rearward of the left and right sides of the headlight 38. The blinkers 40 extend outward in the horizontal direction. The blinkers 40 light up in accordance with the driver's switch operation.

The front cowl 23 includes a front center cowl 23a that surrounds the headlight 38 and supports the visor 35, and front side cowls 23b that are connected to the left and right of the front center cowl 25a. The rear view mirrors 39 are fixed to the front center cowl 23a. The blinkers 40 are fixed to the front side cowls 23b.

Figure 3:
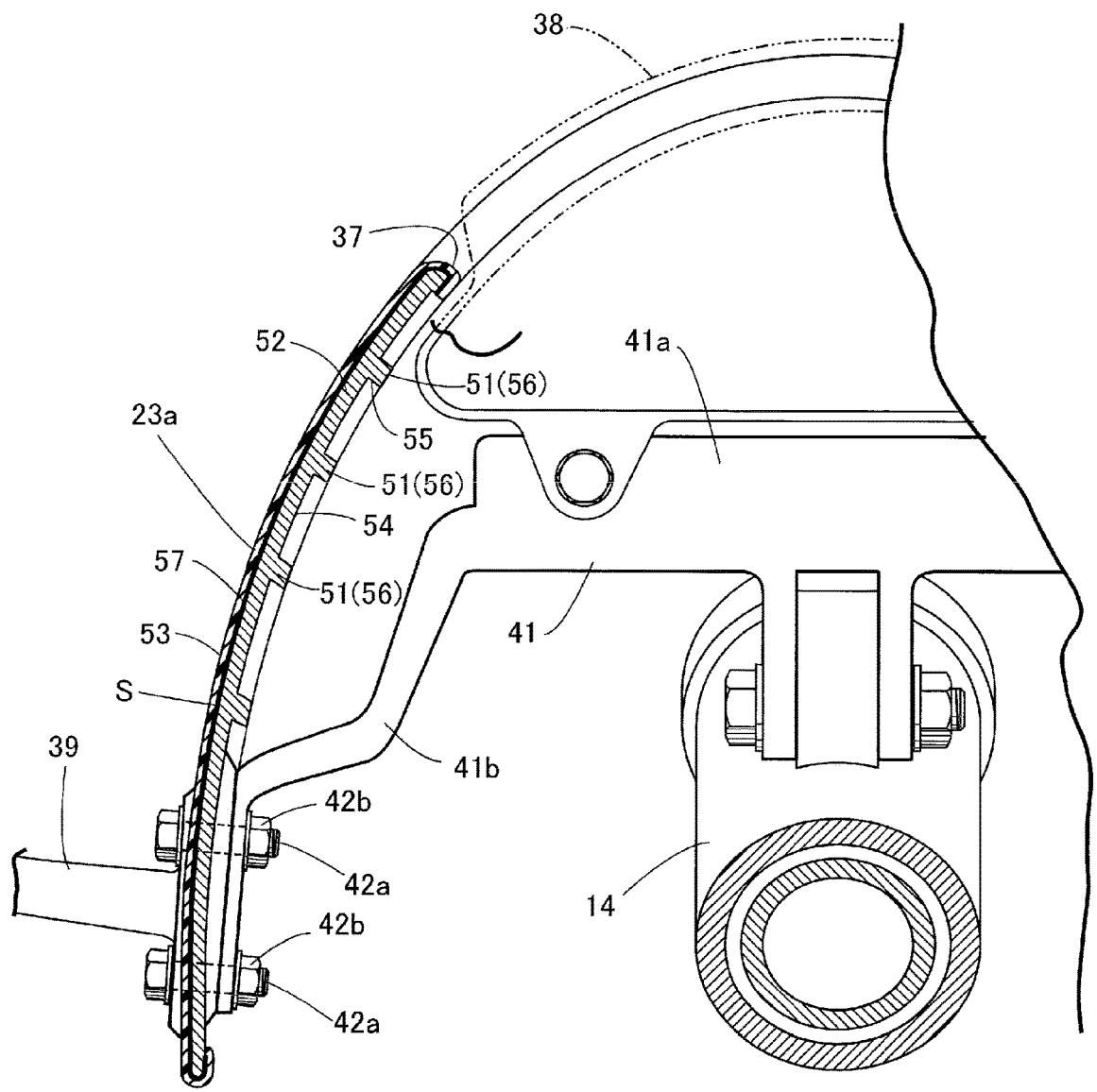
FIG. 3 is a cross-sectional view taken along the line 3-3 of FIG. 1, showing the connecting structure of a front center cowl with the vehicle body frame.

As shown in FIG. 3, a headlight stay 41 that supports the headlight 38 is connected to the head pipe 14. The headlight stay 41 includes a horizontal part 41a that is connected to the head pipe 14 and extends horizontally in front of the head pipe 14, and upward parts 41b that extend upward from the left and right ends of the horizontal part 41a. The headlight 38 is attached to the horizontal part 41a. At the upper end of each upward part 41b, the front center cowl 23a and the rear view mirror 39 are fastened together with bolts 42a and nuts 42b. The front center cowl 23a is fixed to the headlight stay 41 at least at two places on the left and right.

Figure 4:
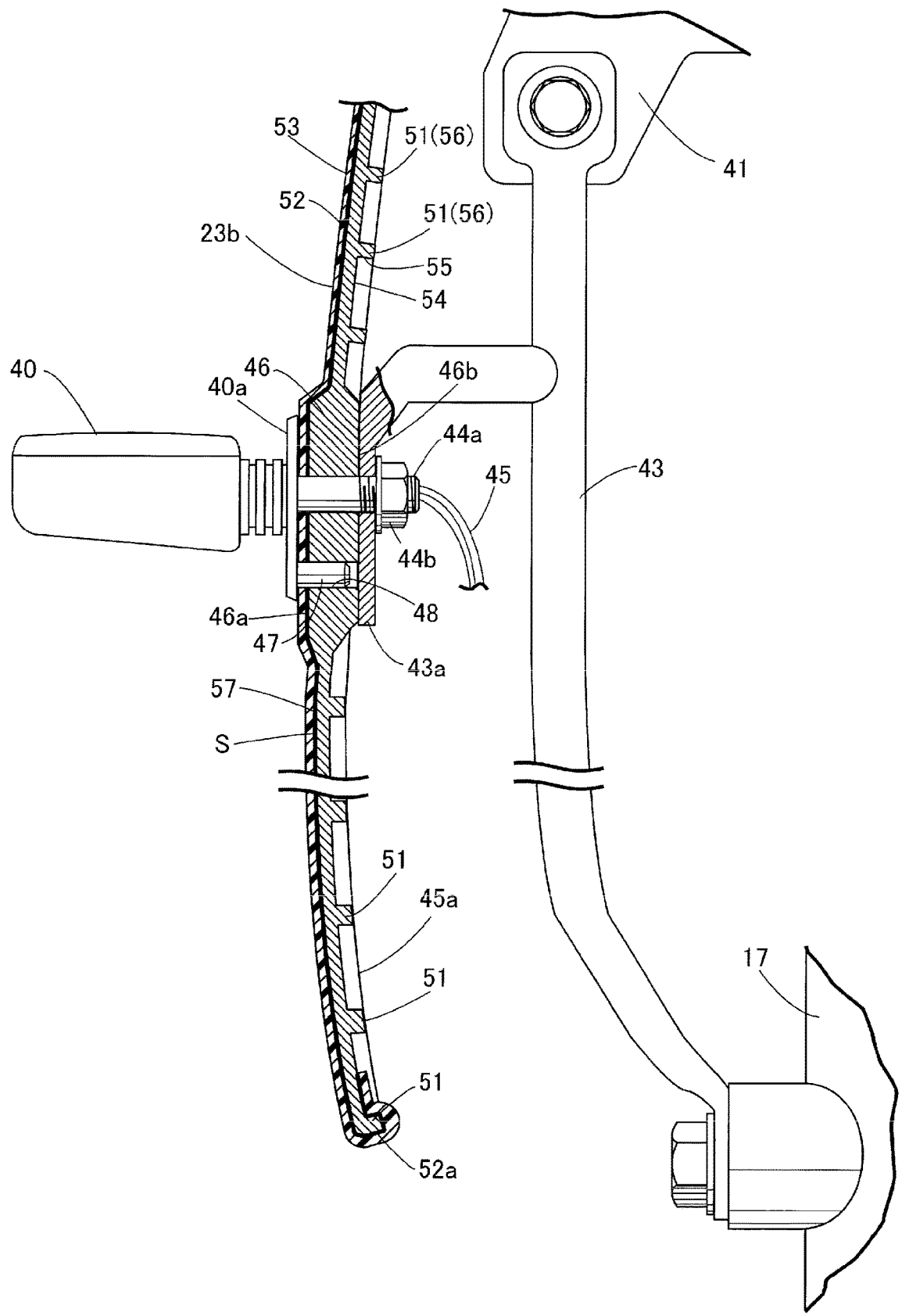
FIG. 4 is a cross-sectional view taken along the line 4-4 of FIG. 2, showing the connecting structure of a front side cowl with the vehicle body frame.

As shown in FIG. 4, blinker stays 43 extend in the front-rear direction at positions laterally of the head pipe 14 on the left and right. The front end of each blinker stay 43 is connected to the horizontal part 41a of the headlight stay 41, and the rear end of the blinker stay 43 is connected to the main frame 17. The front side cowl 23b and the blinker stay 43 are fastened together with a bolt 44a extending from the blinker 40 and a nut 44b. Wiring 45 of the blinker 40 is inserted into the bolt 44a to protrude therefrom. Each of the left and right front side cowls 23b and 23b is fixed to the corresponding blinker stay 43.

Each front side cowl 23b has a mount 46 that bulges from the outer surface of the front side cowl 23b to support the blinker 40. The mount 46 has a flat mounting surface 46a that receives a mounting plate 40a of the blinker 40. The bolt 44a penetrates the mount 46. A detent pin 47 extends from the mounting plate 40a parallel to the bolt 44a at a position away from the central axis of the bolt 44a. The detent pin 47 is fitted into a through hole 48 formed in the mount 46. The detent pin 47 prevents the rotation of the blinker 40 around the axis of the bolt 44a.

The mount 46 has a flat receiving surface 46b on the back side of the mounting surface 46a. This receiving surface 46b receives a mounting plate of the blinker stay 43. The mounting plate 43a of the blinker stay 43 is overlaid on the receiving surface 46b. The mounting plate 43a is fastened to the mount 46 with the nut 44b.

As shown in FIG. 5, the front center cowl 23a includes a substrate 52, and a skin 53. The substrate 52 includes a skeleton 51 that extends in a mesh pattern along a mating surface S. The substrate 52 has a rigidity lower than the required rigidity. The skin 53 has a colored printed surface, coated on the mating surface S, and is fixed to the substrate 52. The skin 53 achieves the required rigidity in cooperation with the substrate 52. The substrate 52 is molded from a resin material. For molding, injection molding is used for example. The outer surface of the substrate 52 is covered with the skin 53, and thus the substrate 52 does not require a surface treatment after molding.

The substrate 52 includes a shell 54 that extends along the mating surface S to fill the gaps of the skeleton 51. The shell 54 corresponds to a shell matching the external shape of the front center cowl 23a. In one example, the shell 54 may have a uniform thickness. In one example, the shell 54 may have a thickness of 0.6 to 1.0 mm.

Filling the gaps of the skeleton 51 with the shell 54 allows the skeleton 51 to function as ribs 56 that intersect like a mesh and define recesses 55 that are open inward. The ribs 56 protrude from the inner surface of the shell 54 to have a predetermined height. In one example, the thickness of the ribs 56 may be 0.8 to 1.0 mm, and the height of the ribs 56 may be 1.0 to 5.0 mm.

The skin 53 is formed of a thermoplastic resin material such as a polycarbonate resin, a polyethylene resin, or an ABS resin material, which may be the same as or different from the resin material of the skeleton 51 or the substrate 52. The skin 53 may include a transparent polycarbonate resin. The skin 53 may include an opaque material. The outer surface of the skin 53 is colored with ink by printing. The coloring may be patterned. The inner surface of the skin 53 also may be colored with ink by printing. In this case, the skin 53 transmits the coloring of the inner surface to be visible to the outer surface of the skin 53. In either case, the coloring visually appears to the outer surface of the front center cowl 23a. The skin 53 has a thickness greater than or equal to the thickness of the shell 54. In one example, the skin 53 may have a thickness exceeding 1.0 mm. When molded alone, the skin 53 has a rigidity that maintains its shape.

Adhesive 57 is laminated between the mating surface S of the substrate 52 and the skin 53. This means that the skin 53 is a laminate bonded to the mating surface S of the substrate 52 with the adhesive 57. The skin 53 is integrated into the substrate 52 with the adhesive 57. As described later, the laminate is prepared by molding of a resin sheet coated on the mating surface S by thermoforming.

The substrate 52 has a through hole 58 that is adjacent to the shell 54 and is partitioned along the mating surface S. The visor 35 is coated on the mating surface S, and covers the through hole 58 to be continuous from the skin 53 bonded to the shell 54. The visor 35 extends outward from the substrate 52 and keeps the shape by itself. As described later, the visor 35 is prepared by molding of a resin sheet that is coated on the through hole 58 at the mating surface S by thermoforming. In one example, the visor 35 is colored in a sunshade color. The front center cowl 23a and the visor 35 are continuous seamlessly in their outer surfaces.

As shown in FIG. 4, the skin 53 wraps around the edge 52a of the substrate 52 at the end of the substrate 52. Thus, the edge 52a of the substrate 52 is covered with the skin 53. The edge 52a of the substrate 52 may be defined with a rib 51.

Figure 6:
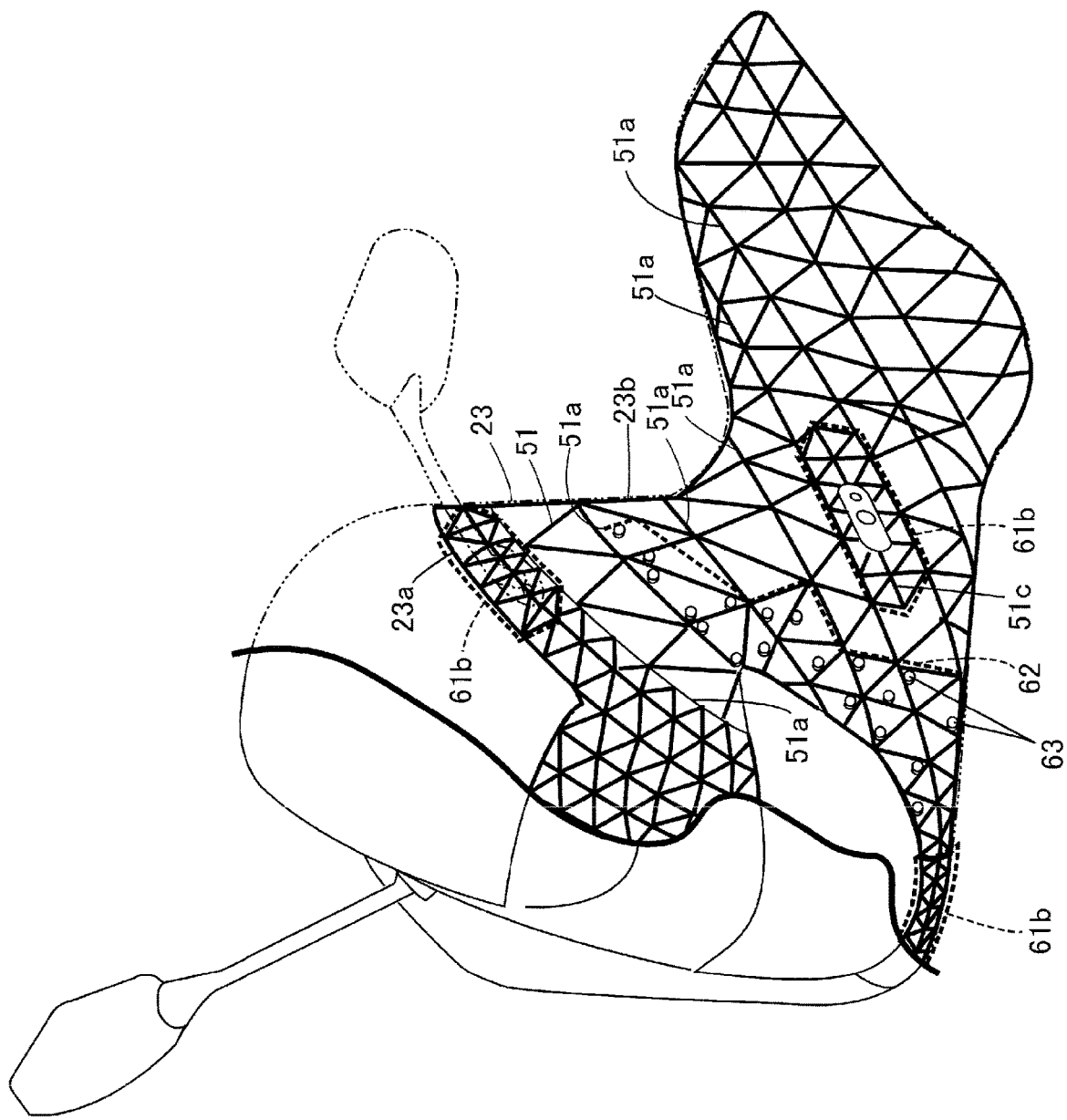
FIG. 6 shows a skeleton (transmissive image through the outer surface) structure showing the arrangement of the skeleton.
Figure 7:
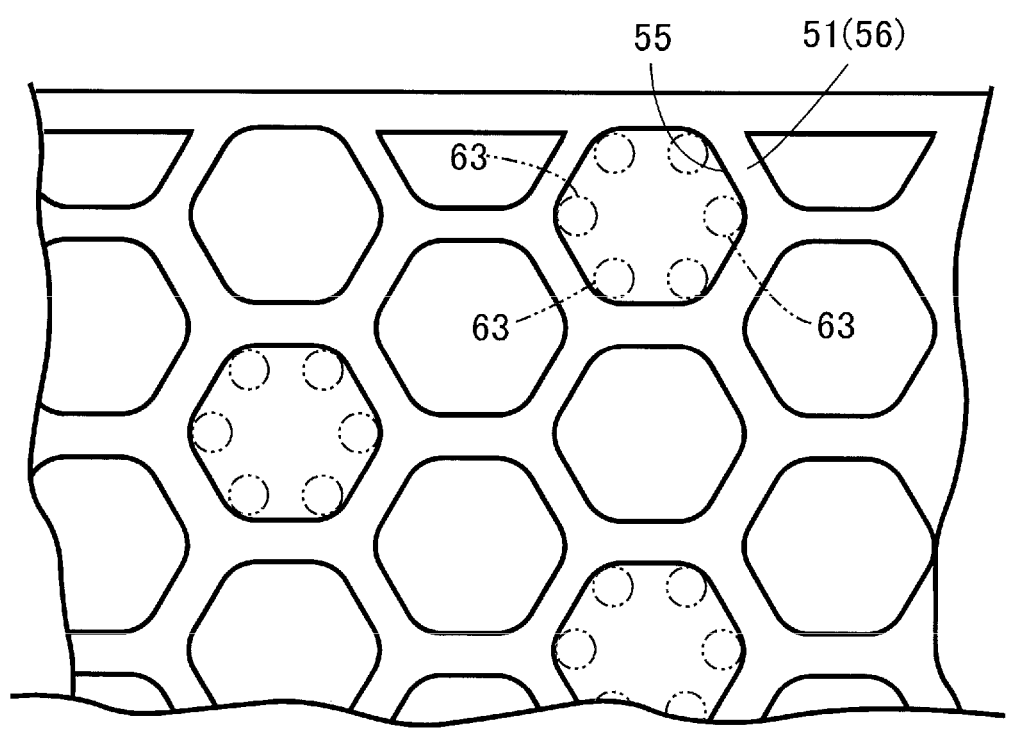
FIG. 7 is an enlarged plan view schematically showing the structure of the skeleton according to one modified example.

As shown in FIG. 6, similarly to the front center cowls 23a, each front side cowl 23b includes a substrate 52, and a skin 53. The substrate 52 includes a skeleton 51 extending like a mesh along the mating surface S. The substrate 52 is made of resin having a rigidity lower than the required rigidity. The skin 53 is made of resin having a colored printed surface, coated on the mating surface S, and is fixed to the substrate 52. The skin 53 achieves the required rigidity in cooperation with the substrate 52. In the front center cowl 23a and the front side cowls 23b, the skeleton 51 has a triangular truss pattern along the mating surface S, for example. The plurality of ribs 56 defines triangular recesses 57 along the inner surface of the shell 54. To define the truss pattern, the skeleton 51 has reference lines 51a extending back and forth in a predetermined direction. In another example, as shown in FIG. 7, the skeleton 51 may have a honeycomb shape connecting hexagons.

Figure 8:
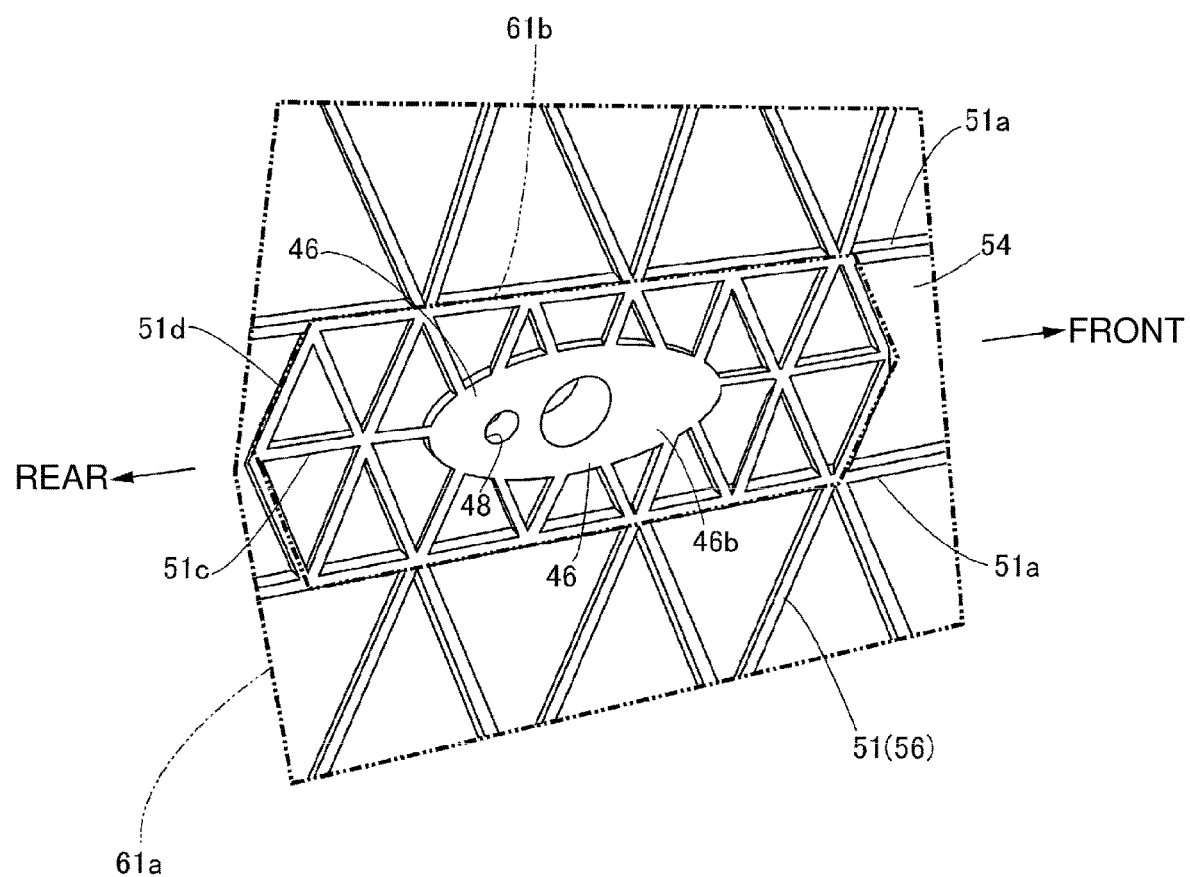
FIG. 8 is an enlarged perspective view schematically showing a mount for blinker.

As shown in FIG. 8, the substrate 52 has a first region 61a that requires a first rigidity and a second region 61b that requires a second rigidity higher than the first rigidity. Rigidity requirements are set during the design phase of the front center cowl 23a and the front side cowls 23b. The substrate 52 of the front side cowl 23b includes the above-described mount 46 in the second region 61b. The mount 46 is located in the middle of the recesses sandwiched between the reference lines 51a located above and below the mount 46, and fine triangular skeletons 51c and 51d stand continuously from the base of the mount 46. The height of the mount 46 is equal to the height of the ribs 56, so that the mount 46 and the ribs 56 are continuous to be flush with each other. As shown in FIG. 4, the mount 46 has a thickness larger than the thickness of the skeleton 51, and as shown in FIG. 8, and it has a larger area (extension) than the skeleton 51 along the mating surface S. The skeleton 51 is arranged with a first density in the first region 61a and with a second density higher than the first density in the second region 61b. The density of the skeleton 51 may gradually increase from the first region 61a to the second region 61b. In this way, the density of the mesh is adjusted according to the locally required rigidity.

Figure 9:
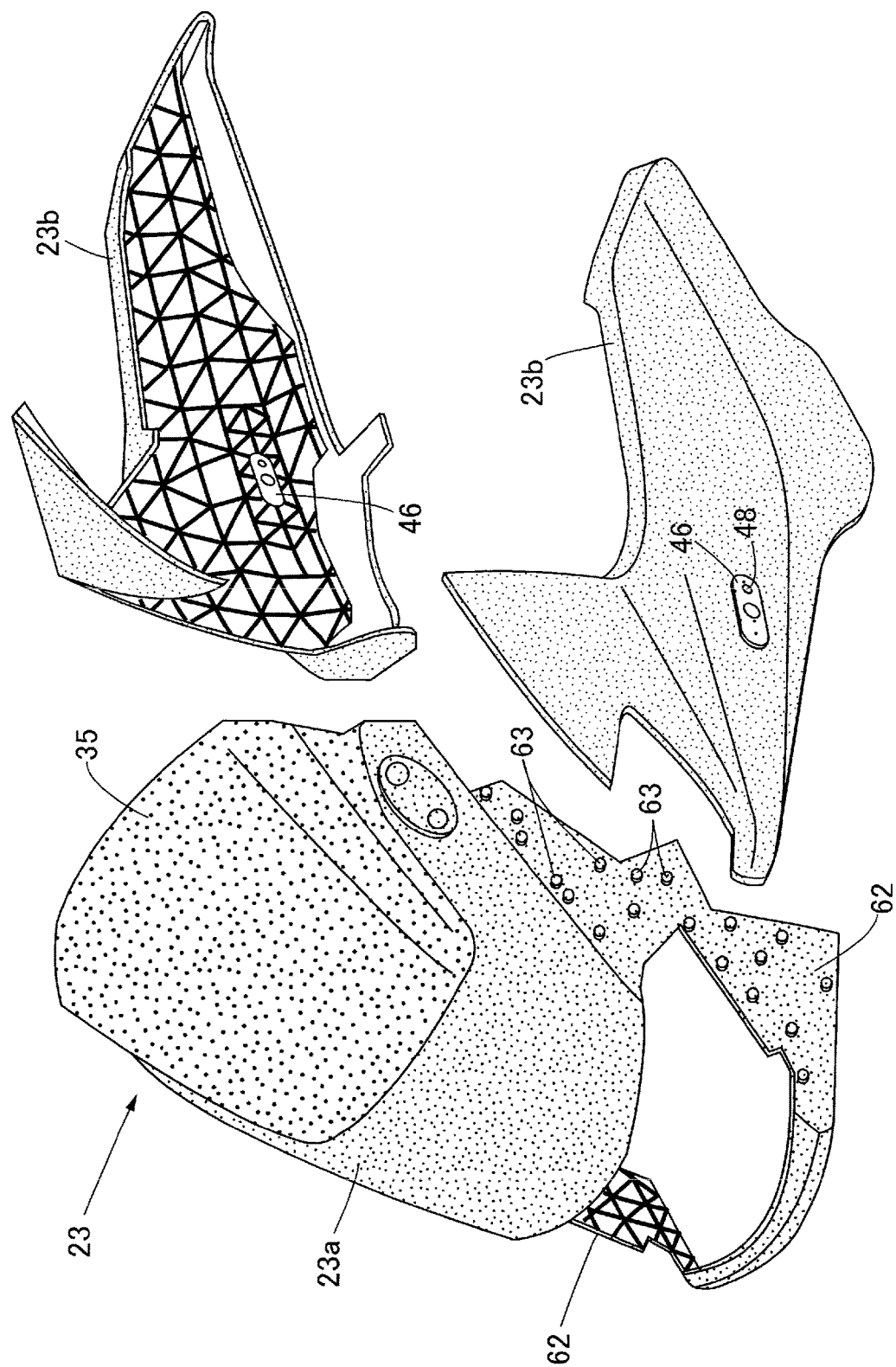
FIG. 9 is an exploded perspective view of the front cowl.

As shown in FIG. 9, the front center cowl 23a includes a support plate 62 for receiving the front side cowls 23b. The inner surfaces of the front side cowls 23b are overlapped on the outer surface of the support plate 62. The front side cowls 23b are connected to the front center cowl 23a. The outer surfaces of the front side cowls 23b are continuous to the outer surface of the front center cowl 23a to be flush with each other. The support plate 62 has a plurality of protrusions 63 on the outer surface. The plurality of protrusions 63 protrude from the outer surface at positions separated from each other, and are fitted into polygonal recesses 58 surrounded by the ribs 56 inside the front side cowls 23b.

Figure 10:
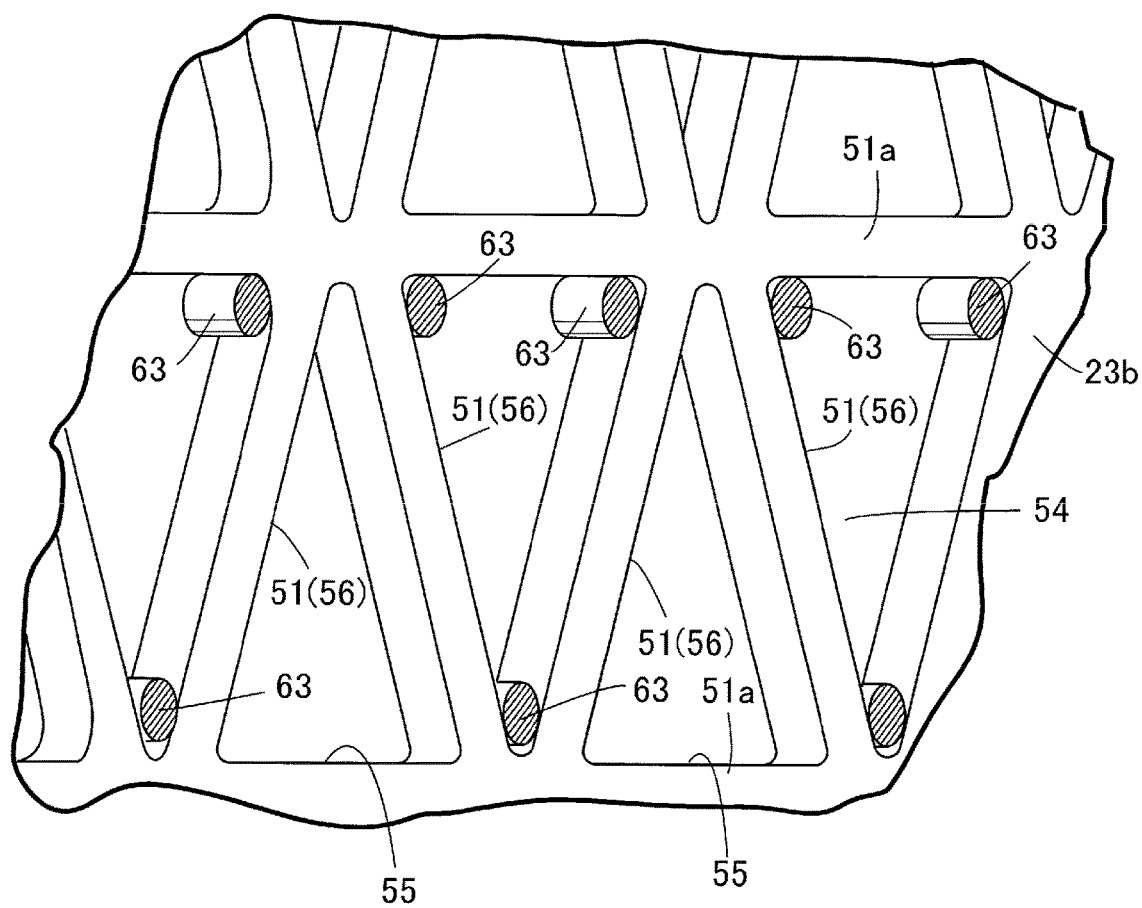
FIG. 10 is a partially enlarged perspective view showing an arrangement structure of protrusions fitted in ribs.
Figure 11:
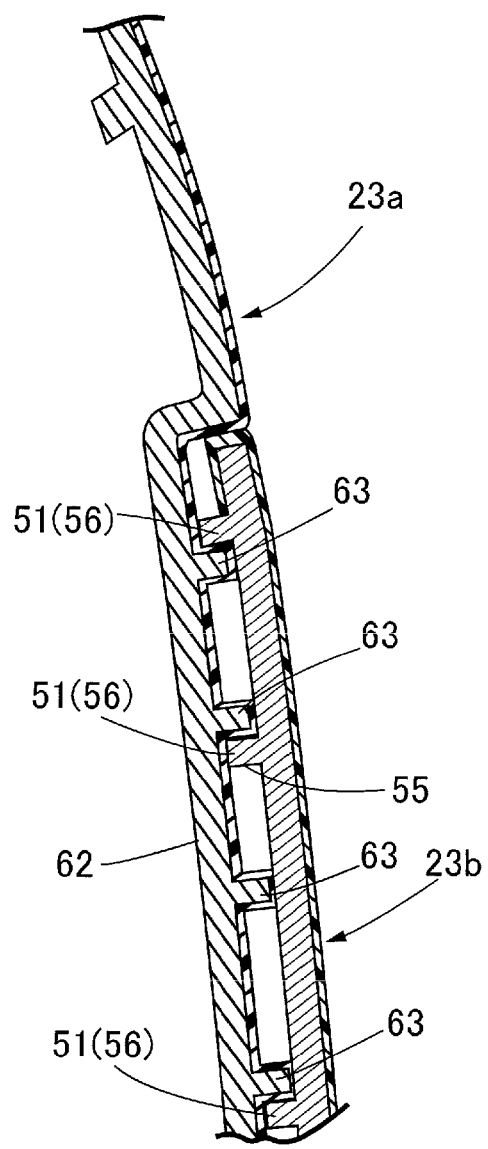
FIG. 11 is an enlarged cross-sectional view showing protrusions fitted into the recesses surrounded by ribs.

As shown in FIGS. 10 and 11, the protrusions 63 are placed at corners of the recesses 58 defined by the ribs 56, and are caught between opposing surfaces of the mutually facing ribs 56 using the elastic deformation of the resin. In one example, the protrusions 63 have a cylindrical shape. The protrusions 63 inserted into the recesses 55 come in contact with the ribs 56 under pressure. In this case, the relative displacements of the front side cowls 23b and the front center cowl 23a are constrained in the vertical direction by the protrusions 63 that are contact from inside in the upper and lower reference lines 51a. The relative displacements of the front side cowls 23b and the front center cowl 23a are constrained in the horizontal direction orthogonal to the vertical direction by the protrusions 63 that are contact from inside in the plurality of ribs 51 connecting the upper and lower reference lines 51a.

Figure 12:
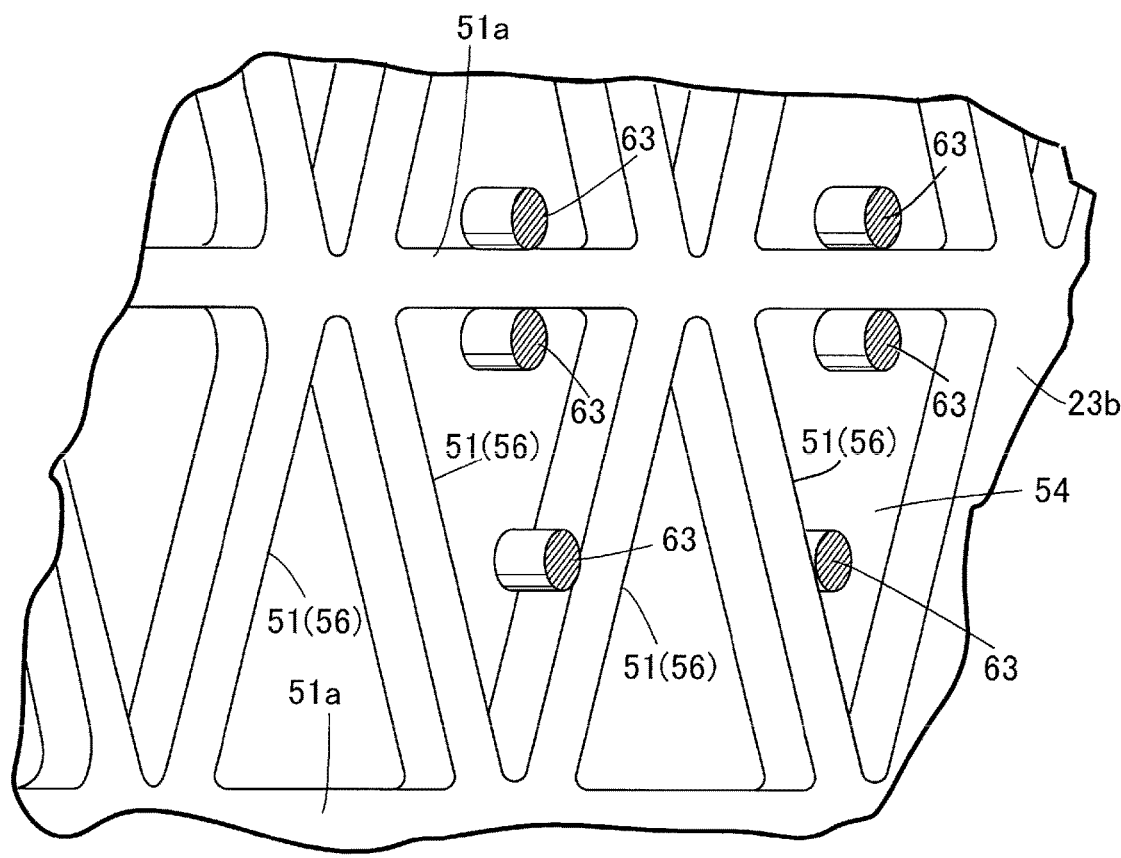
FIG. 12 is a partially enlarged perspective view schematically showing the structure of protrusions according to one modified example.

In another example, as shown in FIG. 12, both side faces of the rib 56 may be sandwiched by protrusions 63 and 63 disposed apart with the interval of the thickness of the rib 56. The protrusions 63 form a pair that comes in contact with the rib 56 under pressure while sandwiching the rib 56 between them. In this case, the relative displacements of the front side cowls 23b and the front center cowl 23a are constrained in the vertical direction by the two protrusions 63 in contact with one reference line 51a from above and below. The relative displacements of the front side cowls 23b and the front center cowl 23a are constrained in the horizontal direction orthogonal to the vertical direction by the two protrusions 63 that are contact to the adjacent ribs 56 from outside. The crossing angle of the ribs 56 of less than 90 degrees between the reference lines 51a may be utilized so that the protrusions 63 may be pressed against the ribs 56 by the action of wedge based on the elastic deformation of the resin.

Figure 13:
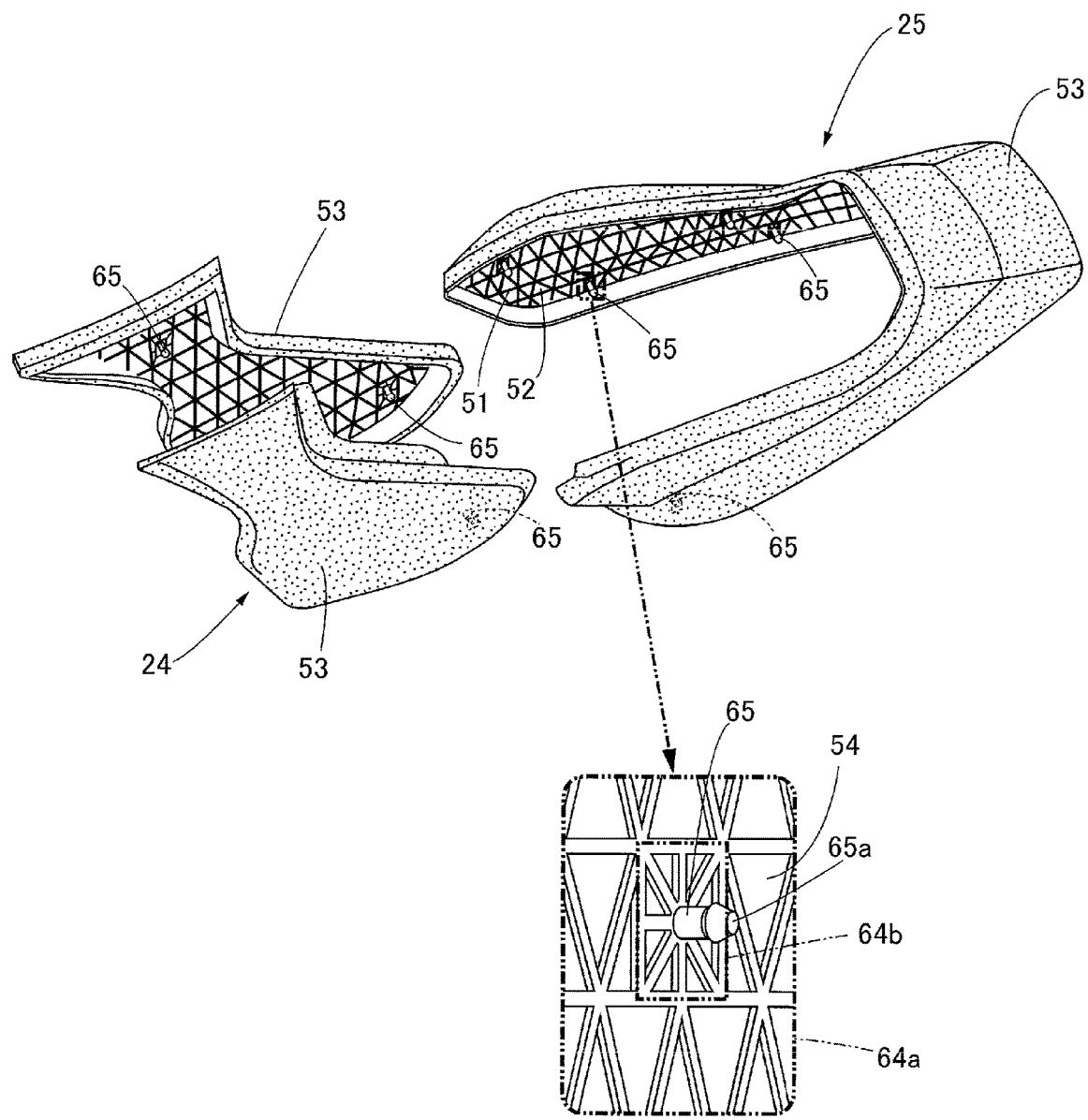
FIG. 13 is an enlarged perspective view of the side cowl and the rear cowl.

As shown in FIG. 13, similarly to the front center cowl 23a, the left and right side cowls 24 and 24 and the rear cowl 25 each include a substrate 52, and a skin 53. The substrate 52 includes a skeleton 51 extending like a mesh along the mating surface S. The substrate 52 is made of resin having a rigidity lower than the required rigidity. The skin 53 is made of resin having a colored printed surface, coated on the mating surface S, and is fixed to the substrate 52. The skin 53 achieves the required rigidity in cooperation with the substrate 52. The substrate 52 has a first region 64a that requires a first rigidity and a second region 64b that requires a second rigidity higher than the first rigidity.

Figure 14:
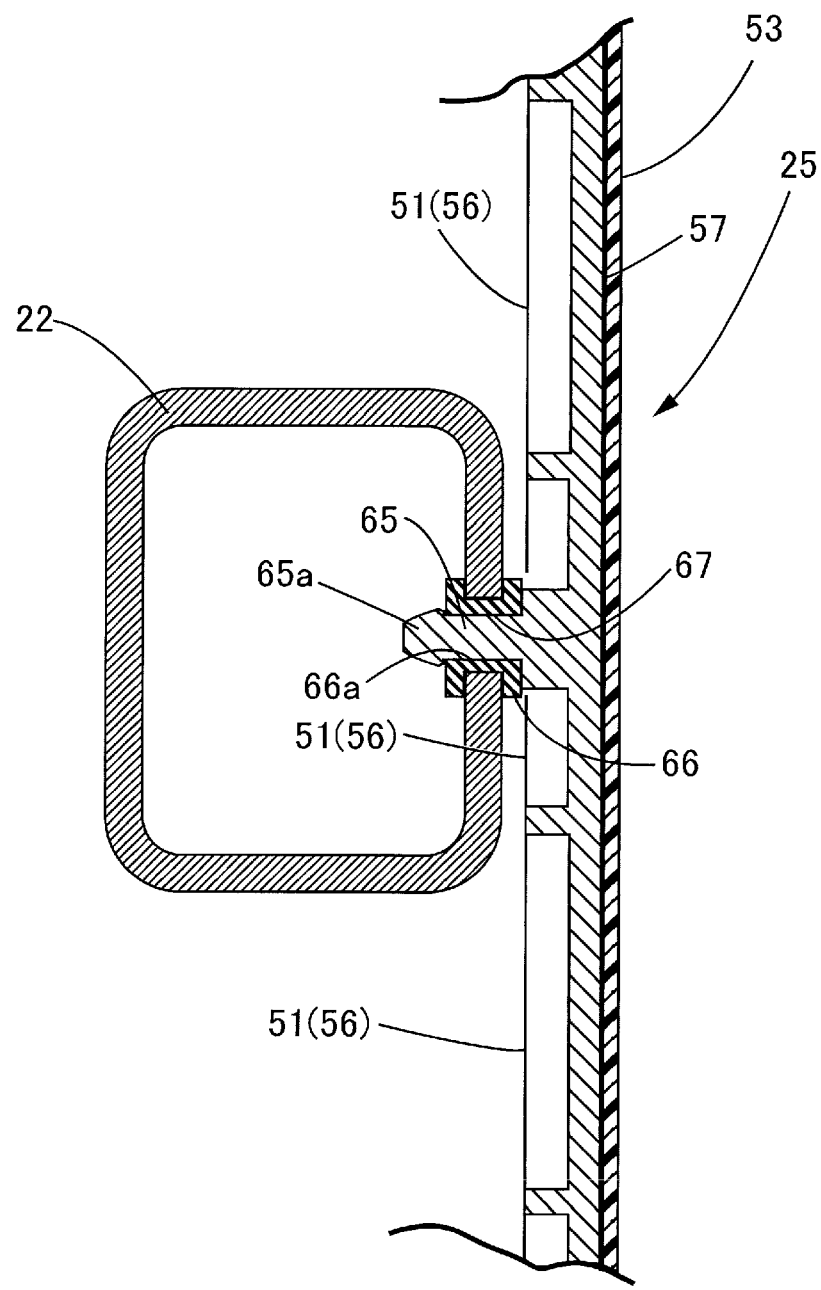
FIG. 14 is a cross-sectional view taken along the line 13-13 of FIG. 1, showing the attachment structure of the rear cowl.

The substrate 52 of the rear cowl 25 includes cylindrical protrusions 65 that project inwardly in the second region 64b. Each protrusion 65 has an umbrella-shaped engaging end 65a at the tip end that has a stepped face facing the shell 54 that expands in the radial direction, and tapers toward the tip. In one example, the left and right side cowls 24, 24 and the rear cowl 25 are mounted to the vehicle body frame 12 as shown in FIG. 14, where the tip of each protrusion 65 is inserted into an insertion hole 66a of a grommet 66 made of elastic rubber held by the rear frame 22. The grommet 66 is fitted into a through hole 67 of the rear frame 22 using the elastic deformation. The tapered engaging end 65a enters the insertion hole 66a utilizing the elastic deformation of the grommet 66. The stepped face of the engaging end 65a prevents the protrusion 65 from coming off from the through hole 67. In this way, the rear cowl 25 is attached to the rear frame 22. The skeleton 51 is arranged with a standard first density in the first region 64a and with a second density higher than the first density in the second region 64b serving as the attachment. The second region 64b is located at a position facing the flat surface formed on the side surface of the rear frame 22. This flat surface receives the ribs 51 when the grommet 66 and the rear cowl 25 are elastically deformed, and plays a role of stopping the swing of the rear cowl 25.

Figure 15:
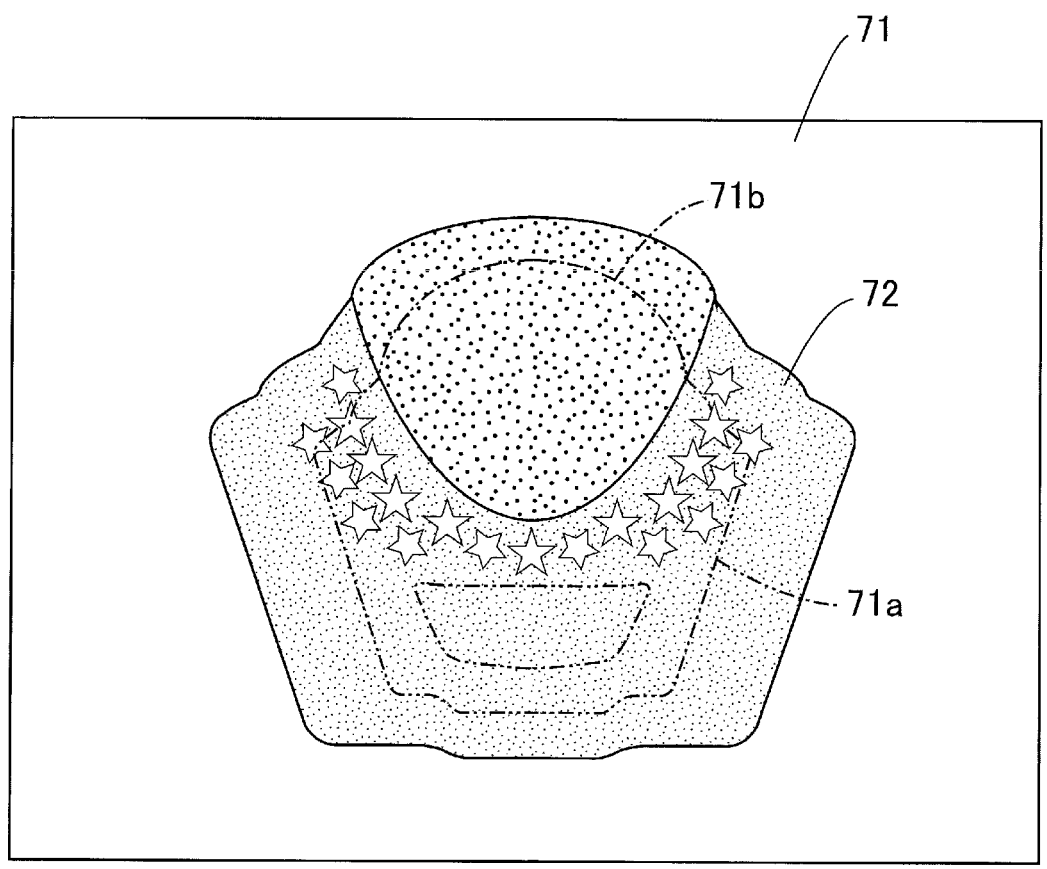
FIG. 15 is a plan view showing the configuration of a decorative sheet.

Next, the following schematically describes a manufacturing method of the cowl 13. The following describes the manufacturing method of the front center cowl 23a and the visor 35 as a representative. Since the front side cowls 23b, the side cowls 24, and the rear cowl 25 are manufactured in the same manner as the front center cowl 23a, the manufacturing of the front center cowl 23a will be described as an example. First, as shown in FIG. 15, a decorative sheet 71 for the front center cowl 23a is prepared. The decorative sheet 71 has an outer surface area 71a for the front center cowl 23a and an outer surface area 71b corresponding to the visor 35, and coloring 72 is printed on these outer surface areas 71a and 71b with ink, for example. Printing includes the case where paint is applied by masking using a template and the case where ink is applied by a printing robot such as for inkjet. Coloring includes single color, multiple colors, and design patterns. In this example, the coloring 72 is applied wider than the outer surface areas 71a and 71b in consideration of the wraparound of the decorative sheet 71 and the trimming allowance.

As shown in FIG. 16A, the substrate 52 of the front center cowl 23a is placed on a support base 74 of a thermoforming apparatus 73. The through hole 58 of the front center cowl 23a is a space, and a special jig 75 is installed for making the shape of the through hole 58 prior to the placement of the substrate 52 so as to allow the outer surface of the substrate 52 and the outer surface of the jig 75 to have continuity. The substrate 52 of the front center cowl 23a is molded in advance. For molding, injection molding is used for example.

The thermoforming apparatus 73 supports the decorative sheet 71 between its lower frame 76a surrounding the support base 74 and its upper frame 76b surrounding a heating plate 77 above the support base 74. The decorative sheet 71 has a surface facing the support base 74, on which the adhesive 57 is stacked. The adhesive 57 may be stacked on the contact surface with the substrate 52. As shown in FIG. 16A, the heating plate 77 is provided above the decorative sheet 71 at a distance from the decorative sheet 71 to heat the decorative sheet 71. As the temperature rises, the decorative sheet 71 softens.

The space above and below the decorative sheet 71 is decompressed. A vacuum is established in the space above and below the decorative sheet 71. After that, as shown in FIG. 16B, the decorative sheet 71 is placed over the surface of the substrate 52. At this time, the space above the decorative sheet 71 is opened to the atmosphere. As a result, as shown in FIG. 16C, the decorative sheet 71 follows the surface of the substrate 52 to adhere thereto. When the space above the decorative sheet 71 is further increased in pressure, the decorative sheet 71 extends around from the edge of the substrate 52 as shown in FIG. 16D. After that, the cutter ascends to cut the unnecessary part of the decorative sheet 71. The surface of the support plate 62 is not coated with the decorative sheet 71. As the temperature of the decorative sheet 71 falls, the decorative sheet 71 hardens. The surface of the substrate 52 is thus coated with the skin 53. No adhesive is attached to a part of the surface of the decorative sheet 71 that overlaps the jig 75, and the skin 46 as it is forms the visor 35 following the outer surface shape of the jig 75.

In this way, the skin 53 is covered on the shell 54 of the substrate 52 for adhesion and integration. The skin 53 contributes to the rigidity of the front center cowl 23a because the wall thickness of the decorative sheet 71 increases. The skin 53 contributes to keep the rigidity, so that the amount of resin in the front center cowl 23a is reduced by at least the amount of the commonly used decorative film. The weight of the front center cowl 23a reduces. The front center cowl 23a is lightened. Similarly, the front side cowls 23b, the side cowls 24 and the rear cowl 25 are lightened.

The skin 53 is thick enough to have the rigidity to maintain the shape by itself, so that a portion of the skin 53 can function as the visor 35.

For the front side cowls 23b, the skeleton 51 is arranged with a first density in the first region 61a requiring a first rigidity and with a second density higher than the first density in the second region 61b requiring a second rigidity higher than the first rigidity. When the blinker 40 is connected to the mount 46, the mount 46 is required to have a rigidity that can withstand the support of the blinker 40. The required rigidity can be kept according to the density of the ribs. In this way, the density of the mesh is adjusted according to the locally required rigidity. The rigidity required for each region can be kept.

For the rear cowl 25, the skeleton 51 is arranged with a first density in the first region 64a requiring a first rigidity and with a second density higher than the first density in the second region 64b requiring a second rigidity higher than the first rigidity. When the protrusion 65 is inserted into the insertion hole 66a of the grommet 66, a rigidity that can withstand the vibrations of the rear cowl 25 is required around the protrusion 65. In this way, the density of the mesh for the rear cowl 25 is adjusted according to the locally required rigidity. The rigidity required for each region can be kept. The required rigidity can be kept according to the density of the skeleton 51. The density of the mesh is adjusted according to the locally required rigidity. The rigidity required for each region can be kept.

To connect the front center cowl 23a and the front side cowls 23b, the ribs 56 of the front side cowls 23b are overlaid on the support plate 62 of the front center cowl 23a. The plurality of protrusions 63 on the support plate 62 are fitted into the recesses 55 surrounded by the ribs 51 of the front side cowls 23b using elastic deformation, so that the front side cowls 23b are closely in contact with the front center cowl 23a for connection. This eliminates fasteners such as screws in the range where the front center cowl 23a and the front side cowls 23b are overlapped, and also suppresses chatter vibration. The outer surface of the front center cowl 23a on the back side of the protrusions 63 is kept smooth, so that the appearance of the front cowl 23 improves.

Alternatively, the plurality of protrusions 63 on the support plate 62 sandwiches both side faces of the rib 56 of the front side cowl 23b based on the elastic deformation, and this also leads to the same effect as described above. The ribs 56 are used for connection, reducing the number of dedicated components for connection, and improving the degree of freedom of the connecting position.

Figure 17:
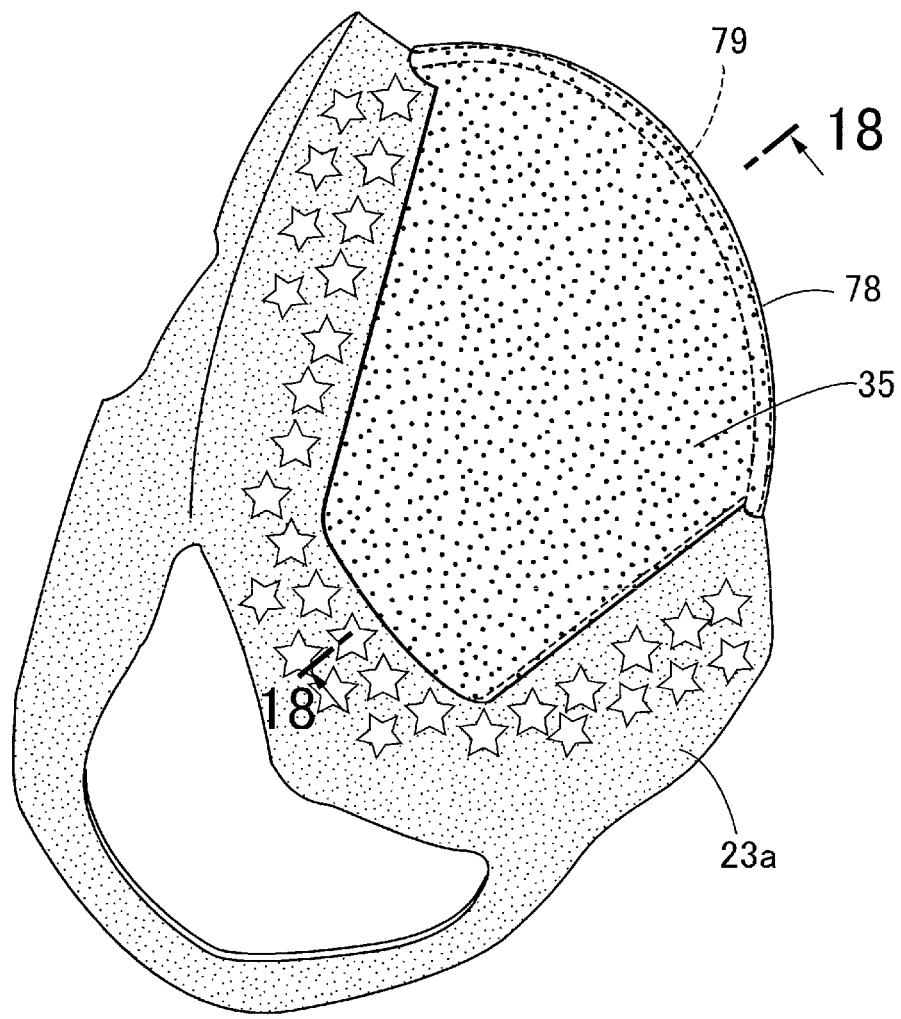
FIG. 17 is an enlarged perspective view showing the substrate of a front center cowl with the bead edge of the visor.
Figure 18:
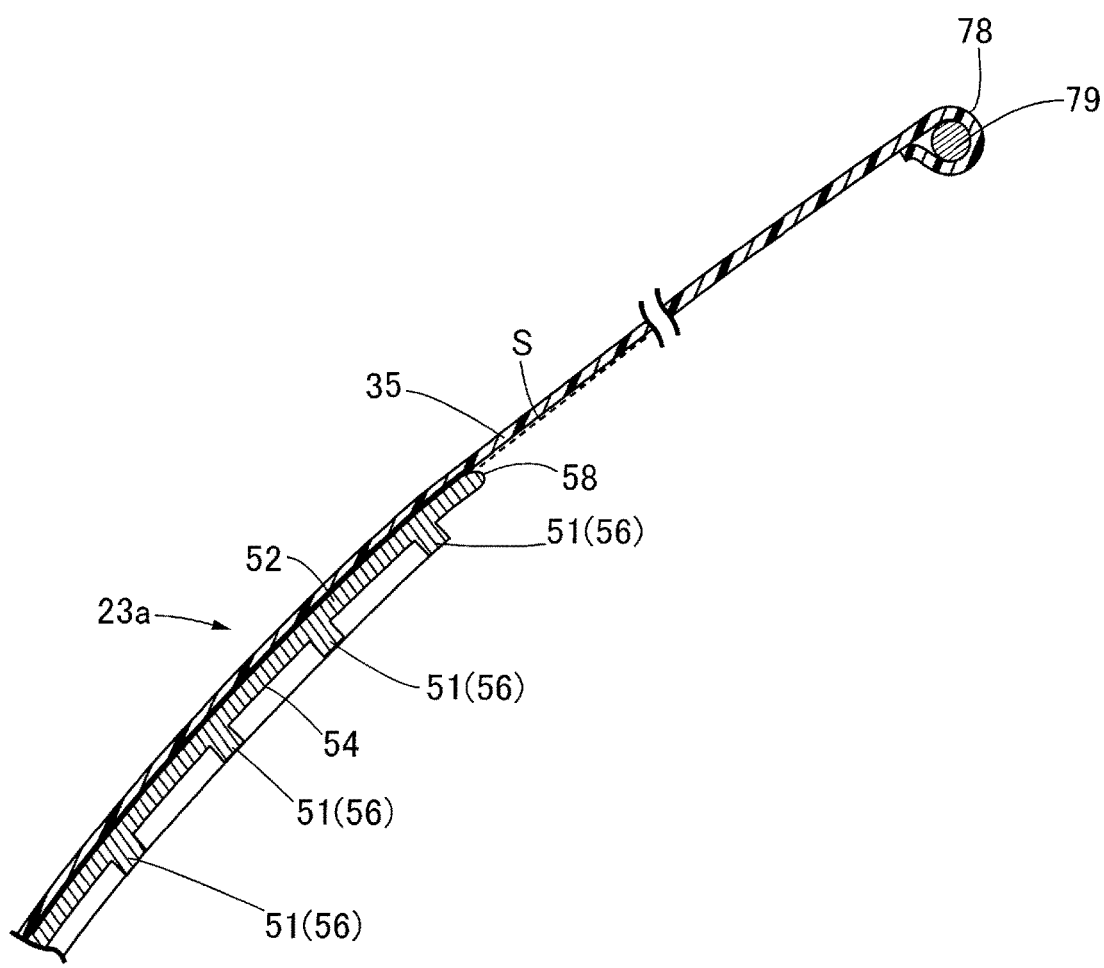
FIG. 18 is an enlarged cross-sectional view taken along the line 17-17 of FIG. 16.

As shown in FIG. 17, the visor 35 may be formed to have a bead edge 78. In this case, an arch-shaped core material 79 is integrally provided on the substrate 52 of the front center cowl 23a along the edge of the visor 35. As shown in FIG. 18, the decorative sheet 71 extends around the core material 79 when covering the decorative sheet 71. Thus, the bead edge 78 is formed on the edge of the visor 35.

Figure 19:
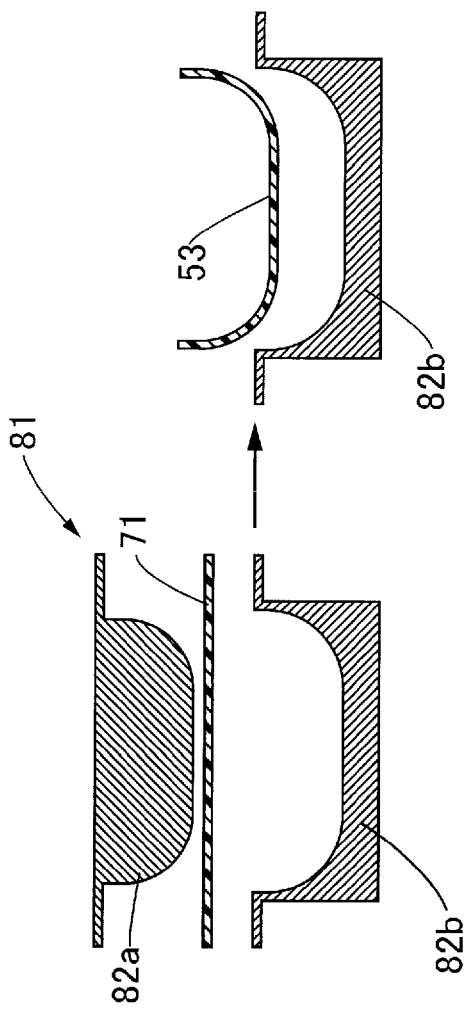
FIG. 19 is a schematic view of a method of manufacturing a front center cowl using a press molding integral injection molding.

In another example, the cowl 13 may be manufactured by the following manufacturing method instead of the above-mentioned manufacturing method. As shown in FIG. 19A, a mold may be used, which is prepared to match the outer shape of the substrate 52, so as to mold the decorative sheet 71 into a skin 53 by a press molding machine 81. For the molding, the decorative sheet 71 is heated to be softened, and the softened decorative sheet 71 is sandwiched between the upper mold 82a and the lower mold 82b for press-molding. After cooling, the decorative sheet 71 is removed from the mold.

As shown in FIG. 19B, the decorative sheet 71 is trimmed along the contour of the skin 53. After trimming, the skin 53 is set in the injection molding machine 83. As shown in FIG. 19C, the upper mold 83a and the lower mold 83b are closed. The lower mold 82b may be held at the position. In one example, a cavity 84 of the front center cowl 23a is formed in advance in the upper mold 83a and the lower mold 83b, and a cavity corresponding to the ribs 51 is formed in the upper mold 83a. The injection molding creates the integrated skeleton 51 and shell 54 on the inner surface of the skin 53, and thus manufactures the front center cowl 23a.

Figure 20:
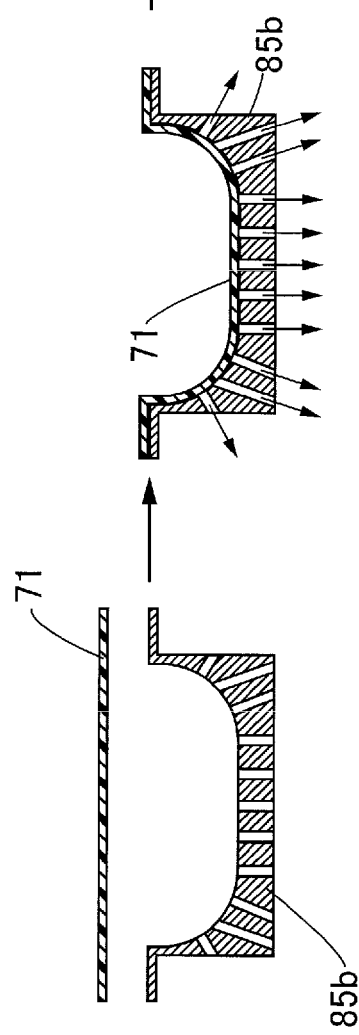
FIG. 20 is a schematic view of a method of manufacturing a front center cowl using vacuum molding and insert injection molding.

In another example, as shown in FIG. 20A, the decorative sheet 71 is set in a lower mold 85b. The pressure between the decorative sheet 71 and the lower mold 85b is reduced. As shown in FIG. 20B, the decorative sheet 71 follows the lower mold 85b. The decorative sheet 71 sticks to the inner surface of the cavity 86. Subsequently as shown in FIG. 20C, the upper mold 85a and lower mold 85b having cavities for the shell 54 and reinforcing ribs 51 are closed, and injection molding is carried out in the cavity 86. After the molds are released, the decorative sheet 71 is trimmed. The front center cowl 23a is thus manufactured.

Figure 21:
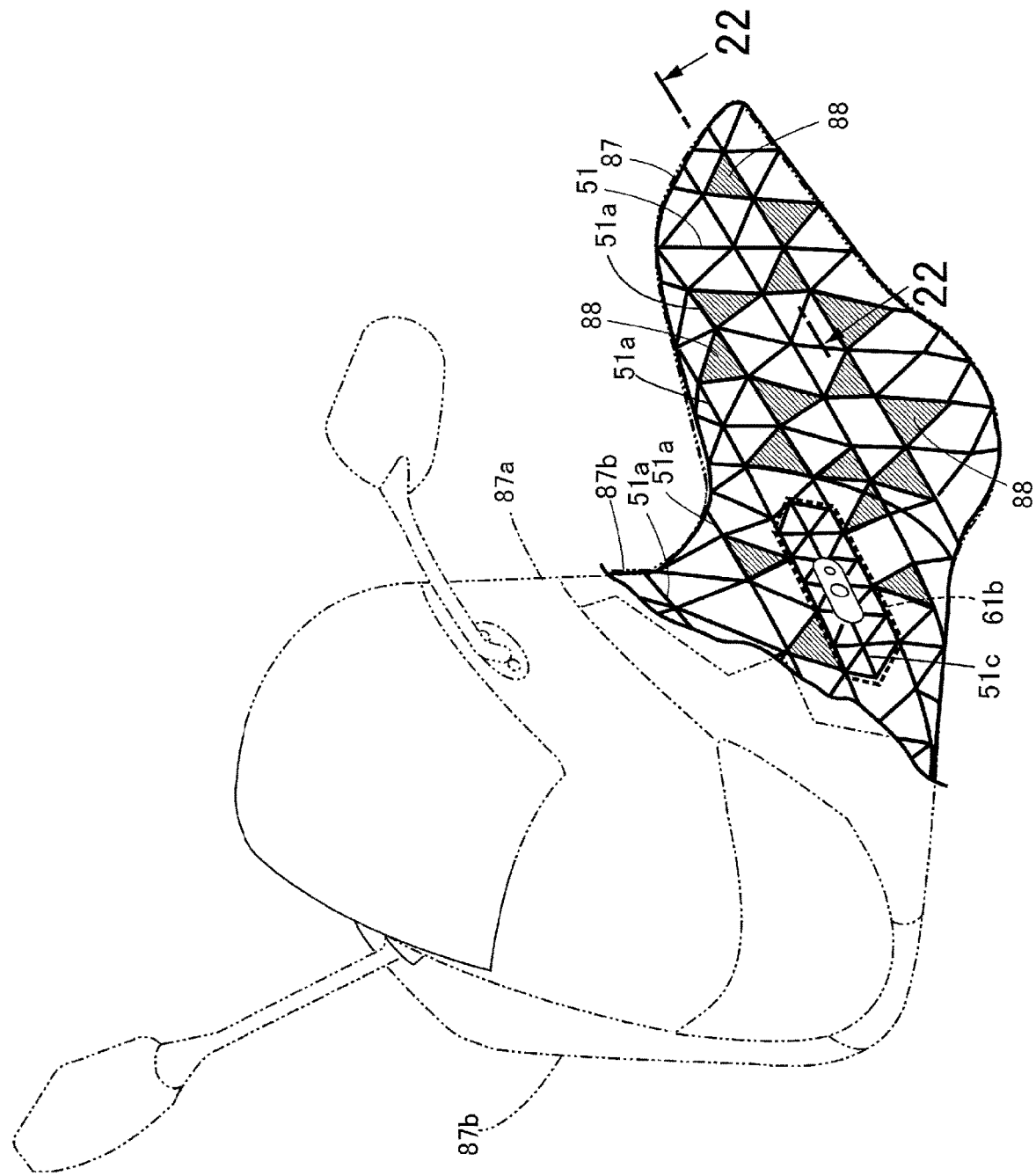
FIG. 21 shows a skeleton (transmissive image through the outer surface) structure showing the arrangement of ribs in the front cowl according to another embodiment.
Figure 22:
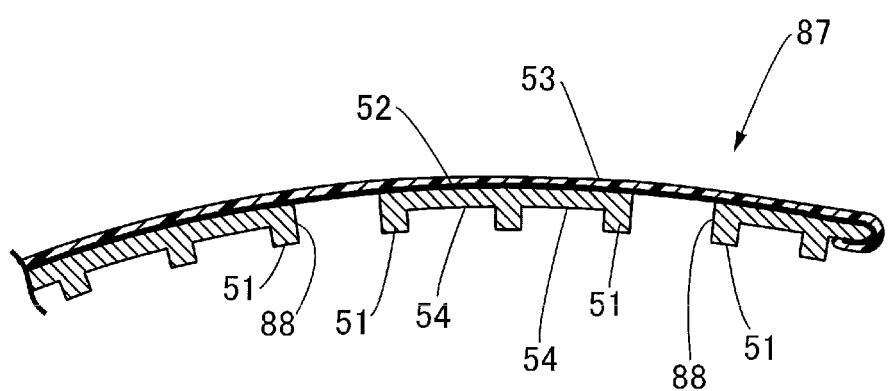
FIG. 22 is an enlarged cross-sectional view taken along the line 22-22 of FIG. 21.

FIG. 21 shows the arrangement of the skeleton 51 in a front cowl 87 according to another embodiment. Similarly to the front cowl 23 described above, the front cowl 87 has a front center cowl 87a and front side cowls 87b connected to the front center cowl 87a on the left and right. The front cowl 87 includes a substrate 52, and a skin 53. The substrate 52 includes a skeleton 51 extending like a mesh along the mating surface S. The substrate 52 has a rigidity lower than the required rigidity. The skin 53 has a colored printed surface, coated on the mating surface S, and is fixed to the substrate 52. The skin 53 achieves the required rigidity in cooperation with the substrate 52. As shown in FIG. 22, the substrate 52 includes a shell 54 that extends to fill some of the gaps between the skeleton 51 along the mating surface S. Without the shell 54, the space 88 surrounded by the skeleton 51 is closed by the skin 53. The space 88 is not limited to the portion shown in FIG. 22, and can be arranged in a plurality of portions surrounded by the skeleton 51 that are indicated with diagonal lines in FIG. 21. The other configuration is the same as the front cowl 23 described above. Omission of the shell 54 at some positions makes the front cowl 87 more lighter in weight.

The invention claimed is:

1. A decorative molded component comprising:
   a substrate comprising:
   a shell extending along a mating surface, and
   a through hole adjacent to the shell and defined along the mating surface;
   a skin bonded to a surface of the shell; and
   a molded body covering the through hole along the mating surface continuously from the skin.

2. The decorative molded component according to claim 1, wherein the molded body at the through hole has transparency.

3. The decorative molded component according to claim 1, wherein the skin is a laminate bonded to the shell at the mating surface with adhesive.

4. The decorative molded component according to claim 3, wherein the laminate is a mold of a resin sheet that is coated to the mating surface by thermoforming.

5. The decorative molded component according to claim 1, wherein the skin and the molded body are a mold of a resin sheet that is coated to the shell and the through hole at the mating surface by thermoforming.

6. The decorative molded component according to claim 2, wherein the skin is a laminate bonded to the shell at the mating surface with adhesive.

7. The decorative molded component according to claim 2, wherein the skin and the molded body are a mold of a resin sheet that is coated to the shell and the through hole at the mating surface by thermoforming.

* * * * *